United States Patent [19]

Duvall, III et al.

[11] Patent Number: 4,666,295

[45] Date of Patent: May 19, 1987

[54] LINEAR FM CHIRP LASER

[75] Inventors: Robert L. Duvall, III, Torrance; Maurice J. Halmos, Los Angeles; David M. Henderson, Playa del Rey, all of Calif.

[73] Assignee: Hughes Aircraft Company, Los Angeles, Calif.

[21] Appl. No.: 627,704

[22] Filed: Jul. 3, 1984

Related U.S. Application Data

[63] Continuation-in-part of Ser. No. 476,288, Mar. 17, 1983.

[51] Int. Cl.⁴ .......................... G01C 3/00; H01S 3/00; G01S 7/28
[52] U.S. Cl. ........................ 356/5; 332/7.51; 350/356; 342/201; 356/28.5; 372/12; 372/28; 372/32
[58] Field of Search ............... 356/5, 28.5; 350/356; 372/12, 28, 32; 332/7.51; 343/17.2 PC; 342/201

[56] References Cited

U.S. PATENT DOCUMENTS

| | | | |
|---|---|---|---|
| 3,363,248 | 1/1968 | Nicodemus | 343/17.2 PC |
| 3,713,042 | 1/1973 | Kinsel | 350/160 |
| 3,950,100 | 4/1976 | Keene et al. | 356/28.5 |
| 4,190,361 | 2/1980 | Dubrunfaut | 356/5 |
| 4,240,746 | 12/1980 | Courtenay et al. | 356/5 |
| 4,284,351 | 8/1981 | Alldritt et al. | 356/28.5 |
| 4,447,149 | 5/1984 | Marcus et al. | 356/5 |
| 4,528,525 | 7/1985 | Eden et al. | 332/7.51 |

OTHER PUBLICATIONS

J. E. Kiefer et al., IEEE Journal of Quantum Electronics, Feb. 1972, p. 173.
A. Yariv et al., IEEE Journal of Quantum Electronics, vol. QE-9, No. 6, Jun. 1973, p. 594.

Primary Examiner—Stephen C. Buczinski
Attorney, Agent, or Firm—Ronald L. Taylor; A. W. Karambelas

[57] ABSTRACT

A laser radar system employing a linear FM chirp laser followed by post detection pulse compression by a surface acoustic wave (SAW) device. The system includes an FM chirp modulator that provides the needed tuning range and linearity for pulse compression. This modulation is accomplished by using a high-pressure $CO_2$ laser with an intracavity electro-optic modulator of CdTe. The frequency of the transmitter laser is accurately controlled through the application of high linearity, high frequency, sawtooth voltages to the two plates of the CdTe crystal, with the voltage waveform applied to one plate being out of phase with that applied to the other crystal plate. With the performance the system offers, absolute radar ranges can be measured to 0.22 m and velocities to 0.37 m/sec.

26 Claims, 22 Drawing Figures

PULSE WIDENING
IN NORMALIZED UNITS

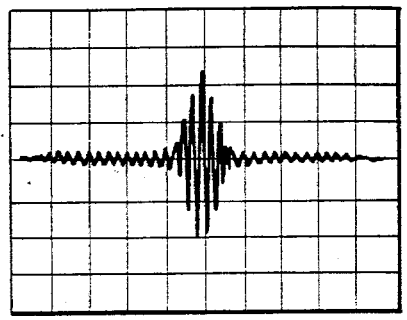
Fig. 14.
Fig. 15.
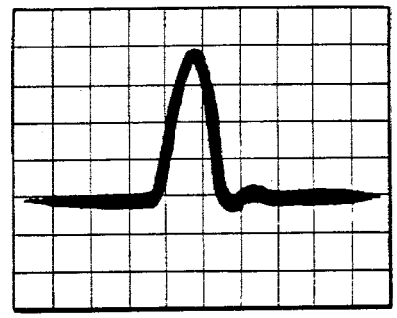
Fig. 16.
START PULSE
$t_r = \dfrac{t_+ + t_-}{2}$
UPWARD SAW
DOWNWARD SAW
$t_+ - t_- = 2\,fd$

LINEAR FM CHIRP LASER

CROSS-REFERENCE TO RELATED APPLICATIONS

This patent application is a continuation-in-part of application Ser. No. 476,288, filed Mar. 17, 1983.

TECHNICAL FIELD

The present invention relates to radar systems and, more particularly, to laser radar systems.

BACKGROUND OF THE INVENTION

A number of prior references which are of background interest relative to the present invention appear in a numbered list toward the end of the present specification and certain of these articles will be referenced, using the numbers of the listed references, in brackets, in this specification.

Radar systems have been employed in both non-military and military applications for a number of years. In recent years, the technical advances required in radar systems for the military have been considerable. When first employed in World War II, the accuracy and speed of radar were not overly critical. The radar was used to detect slow-moving ships and planes which could then be engaged on a not-too-critical time basis. More recently, speed and accuracy have become critical in order to allow the timely detection and destruction of smaller, fast-moving missiles having high destructive power. In addition, these contemporary radar systems are required to perform in an environment filled with highly efficient countermeasure devices.

Because of its resistance to jamming and interference from outside sources, and its superior range and angular accuracy, light has replaced electro-magnetic energy in many applications including communications and measuring systems. Laser rangefinder techniques have been successfully shown to determine the ranges of targets at distances up to five miles with accuracy of 2 to 10 meters, see reference [1], listed at the end of this specification. As with conventional radar systems, laser systems may be classified into two basic categories: (1) direct, or incoherent detection, and (2) heterodyne or coherent detection.

The theory of the former dictates that the best signal-to-noise ratio is provided when the transmitted energy is concentrated into the shortest possible pulse [2]. This yields a good range measuring and resolution capability. On the other hand, coherent detection requires highest possible average transmitted power for the best signal-to-noise ratio, irrespective of pulsewidth. In addition, accurate target radial velocity measurements can be obtained in the latter case. Woodward [3] pointed out, during the early stages of modern radar technology, that radar resolution and accuracy were functions of the signal bandwidth, being AM or FM in nature, regardless of the transmitter waveform. Thus a continuous power, or long pulse mode of operation heterodyne system, may also yield good range measuring and resolution capability when using a wideband signal. One technique for obtaining a wideband signal is to frequency modulate the long pulse, and this has been termed a "chirped" signal, see reference [9], and the associated receiver includes matched delay vs. frequency components to compress the return pulses. A more complex receiver is required to extract the wideband information available from this type of reflected signal, as opposed to the direct detection system. These receivers, as used in conventional radar systems, are designated as matched-filter signal processing receivers. The advantages of such signal processing techniques in radars, as pointed out by Cook [4], are:

1. More efficient use of the average power available at the transmitter.
2. Increased system accuracy, both in ranging and velocity measurements.
3. Reduction of jamming vulnerability.

In a recent publication [5], a laser range finder using heterodyne detection and chirp pulse compression is described. The wideband signal consists of a linear FM chirp pulse of relative long duration. The matched-filter at the receiver end is a Surface Acoustic Wave (SAW) device, which compresses the relative long FM chirp pulse into a narrow one (of the same bandwidth), from which the range and velocity information may be extracted. The duration of the compressed pulse is approximately the inverse of the bandwidth of the original signal. Thus, as the amount of frequency that is chirped increases, so does the resolution of the range and velocity measurements. In the above work, as described in greater detail hereinafter, an acoustooptic modulator, placed at the output of the laser, was used to obtain a chirp width of 14 MHz. This would yield a compressed pulse of the order of 100 ns. Further increases in frequency deviation, with attendant reduction in pulse width, are limited by transit time of the acoustic wave across the optical beam.

Hulme et al (Optical and Quantum Electronics 13, 1981, 35–45), reference [5], for example, have demonstrated a $CO_2$ laser range finder using FM chirp modulation and pulse compression. They modulate the laser outside the laser cavity using acoustic optic (AO) modulation. It is an object of the present invention to provide an order of magnitude increase in range resolution because of wider frequency deviation employing an electro-optic (EO) modulator and a high-pressure $CO_2$ laser.

Stein (IEEE J. of Quantum Electronics, August 1975, 630–31) previously used intracavity EO modulation to chirp a high-pressure laser in a radar system that does not use pulse compression. However, he only achieved a 20 MHz chirp with a pulse having a linear ramp during a portion of the pulse. He makes no mention of the specific percent linearity achieved. From the graphical data he provides, however, it appears that the linearity was poor, and it is apparent that an attempt at pulse compression of the type described herein would not have been successful. This difficulty with precise linearity was also encountered by Hulme and Collins [Society of Photo-Optical Instrumentation Engineers' Proceedings; Vol. 236, pp. 135–138]. It is, in fact, this finding that compelled them to use the acousto-optic modulation as described above. It is another object of the present invention to provide high linearity frequency modulation of about 100 MHz thus making usable, broadband, pulse compression possible.

More generally, it is an object of the present invention to provide a laser radar which overcomes the limitations of the prior art described above.

SUMMARY OF THE INVENTION

In accordance with the teachings of the present invention, a transmitter laser is provided that emits laser light at approximately a preselected center frequency.

The light of the transmitter laser is frequency modulated in linear chirps by passing it through an electro-optical crystal disposed within the cavity of the transmitter. The crystal is driven with a linear chirp drive signal from a precision linear driver. A local oscillator laser is also provided that emits laser light at a predetermined frequency offset from the center frequency by a frequency substantially greater than the maximum frequency shift of the transmitter laser. A portion of the light from the transmitter and local oscillator lasers is sensed and used to adjust the frequency of the two lasers to maintain the transmitter and local oscillator lasers so they emit light at exactly the preselected center and offset frequencies, respectively. The balance of the light from the transmitter laser is transmitted as the radar beam. Reflected return signals of the transmitted laser beam from a target are heterodyned with a portion of the light from the local oscillator to form a combined beam. The combined beam is detected and converted to an resultant electrical signal. The signal is applied to a matched surface acoustic wave delay means to create a sharp output pulse. The output pulse is used as a return signal from the radar for processing and analysis.

In accordance with another aspect of the invention, an FM chirp laser radar system may include a transmitter laser including an intracavity electro-optical modulation crystal means for sweeping the frequency of the laser, and a pair of high voltage driver circuits for applying linear up-and-down chirp sawtooth waves each having a peak-to-peak voltage greater than 100 volts, to the two plates of said crystal, with the two sawtooth waves being approximately 180 degrees out-of-phase.

In accordance with additional features of the invention, the two sawtooth voltages may have a pulse repetition rate greater than 200 KHz, with a linearity held within two percent.

Other objects, features and advantages of the invention will become apparent from a consideration of the following detailed description and from the accompanying drawings.

BRIEF DESCRIPTION OF THE DRAWINGS

FIG. 14 is a drawing of the display of the frequency spectrum of the weighted pulse;

FIG. 15 is a drawing of the demodulated pulse obtained from the output of the SAW;

FIG. 16 shows a graphical description of Equation 28;

FIG. 21a and 21b together form a detailed circuit diagram of the circuit of FIG. 20.

DETAILED DESCRIPTION OF THE INVENTION

The purpose of the present invention is to measure absolute radar range and velocities of terrain, targets and obstacles. This invention allows better resolution than previously achieved because the intracavity chirp modulation technique allows frequency deviation to about 100 MHz with corresponding pulse width of 15 nanoseconds, or billionths of a second. This is an order of magnitude better than previous state-of-the-art in other FM-CW laser radar approaches. It also provides an absolute range reading that conventional AM-CW laser radars cannot achieve. Finally it offers good utilization of the CW laser output, as opposed to pulsed systems in which the continuous power capability is wasted.

In the following, the theoretical background, construction and performance of a $CO_2$ heterodyne system that uses the basic concept for matched-filter signal processing as mentioned above, is described. The transmitter, however, consists of a novel design, which increases the chirp-width by a factor of about ten, and avoids any problems of beam steering that may be injected by an acousto-optic modulator. The transmitter laser is frequency modulated by a CdTe FM cut crystal modulator, which is placed inside the laser resonator. Using the intracavity modulator in a testing environment, the Applicants obtained linear chirp pulses of approximately 95 or 100 MHz. This in turn yielded compressed pulses of about 15 ns. Weighted and unweighted processes are also described hereinafter, where the weighting filter is shown to increase the compressed pulse width to 20 ns, while reducing the sidelobes.

Thereafter, the theoretical aspects of the heterodyne system, the laser modulation process, and chirp pulse compression using the SAW device are described. Detailed descriptions of the experimental set up and results are given. Also, non-linear effects are discussed and the experimental results presented. In the final portion, a usable radar configuration is described, the signal processing for the laser radar system is given, and certain of the parameters of the system are calculated.

THEORETICAL DESCRIPTION

Heterodyne Detection

Heterodyne detection systems are playing an increasing role in the rangefinder field. Some of the clear advantages are:

1. Doppler shifts enable measurement of target radial velocity.
2. There is an energy sensitivity advantage over direct detection typically amouting to a factor of 100 at 10.6 m [5].
3. Less peak power is needed, since long pulses are typically used.

Figure 1:
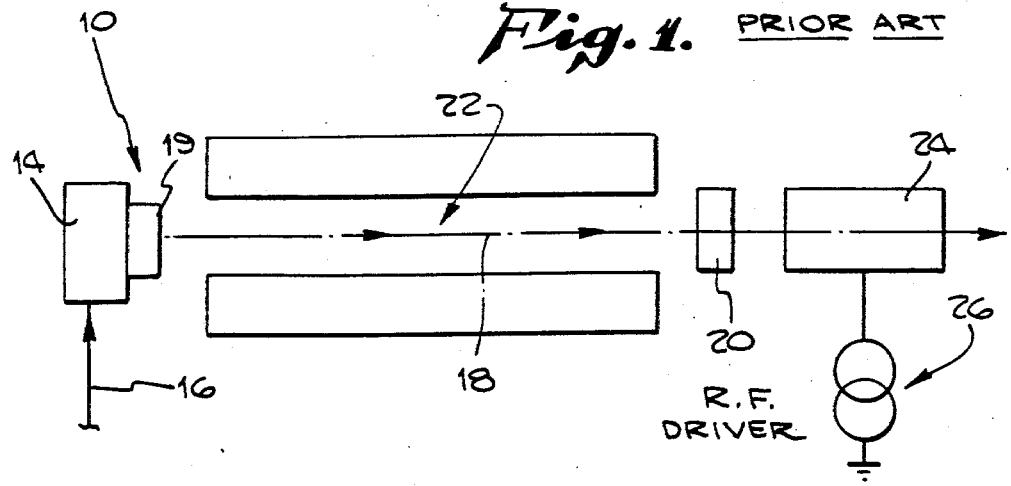
FIG. 1 is a simplified drawing showing a prior art approach to modulating a laser beam outside the laser cavity.

The block circuit diagrams of two prior art circuits mentioned hereinabove will now be considered in connection with FIGS. 1 and 2. The Hulme et al approach, Reference [5], is shown in simplified form in FIG 1. The laser is shown generally at 10 and comprises, in the usual manner, a high reflectivity end mirror 19 and an output mirror 20 on the other end between which the laser gain medium generally indicated as 22 is contained. As the laser light 18 emerges from the cavity of the laser 10 through mirror 20, it passes through the acousto-optic element 24 which is driven by modulating driver 26, which imparts the modulation thereto.

Figure 2:
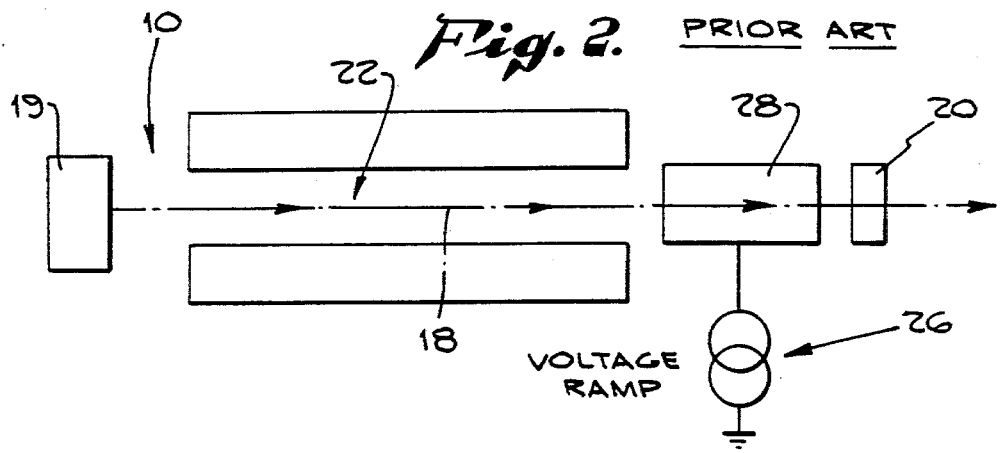
FIG. 2 is a simplified drawing showing a prior art approach to modulating a laser beam inside the laser cavity.

The Stein apparatus, referenced above, is shown in simplified form in FIG. 2 and is similar to the Hulme et al apparatus, with the exception that the acousto-optic element 24 of Hulme is replaced by an electro-optic crystal 28 of a conventional variety, which is placed within the cavity of the laser 10 ahead of the output mirror 20. The driver 26 of FIG. 2 as used in the Stein apparatus provided periodic spaced pulses which apparently included an initial transient, a linear ramp portion with a downward slope and then a non-linear "flyback" portion of the pulse.

Figure 3:
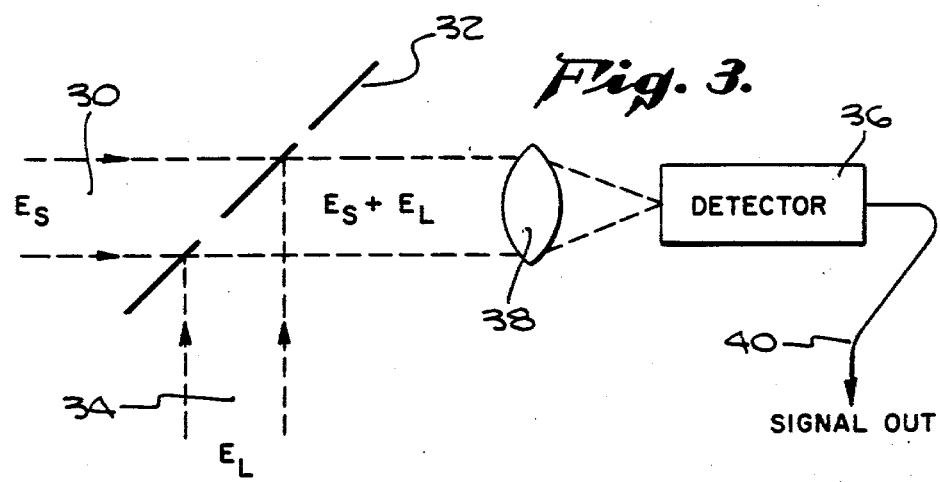
FIG. 3 is a simplified drawing showing a method of detecting a heterodyned light signal.

A typical configuration for a heterodyne detection scheme is shown in FIG. 3. The light signal of interest 30 (labeled "$E_S$") is mixed at dielectric beamsplitter 31 with light 33 from a local oscillator (labeled "$E_L$"). It is then focused on detector 37 by lens 39 which results in an electrical signal reflecting $E_S + E_L$ on the output line 41. The signal on line 41 can then be used in the normal manner.

The optical signal may be represented by, $$E_S(t) = A_S(t)\, \exp j[\omega_S t + \phi_S(t)] + C.C. \tag{1}$$

where $A_S(t)$ is the complex, slow varying amplitude of the field, $\omega_S$ is the center frequency, and $\phi_S(t)$ is the phase of the field which may be a function of time.

The local oscillator is represented by, $$E_L(t) = A_L(t)\, \exp j[\omega_L t + \phi_L(t)] + C.C. \tag{2}$$

where $A_L(t)$ may be fixed as a constant $A_L$. For all practical purposes we can assume the local oscillator to be perfectly coherent. Thus we allow $\phi_L(t)=0$.

The a.c. components at the detector end will be $$S_h(t) = |Ed|^2(t) = A_L A_S(t)\, \exp j[(\omega_S - \omega_L)t + \phi_S(t)] + C.C. \tag{3}$$

Thus both the amplitude and phase information are preserved, where the carrier frequency has been scaled down to the difference frequency of the received signal and the local oscillator.

Linear FM Chirp

Figure 4:
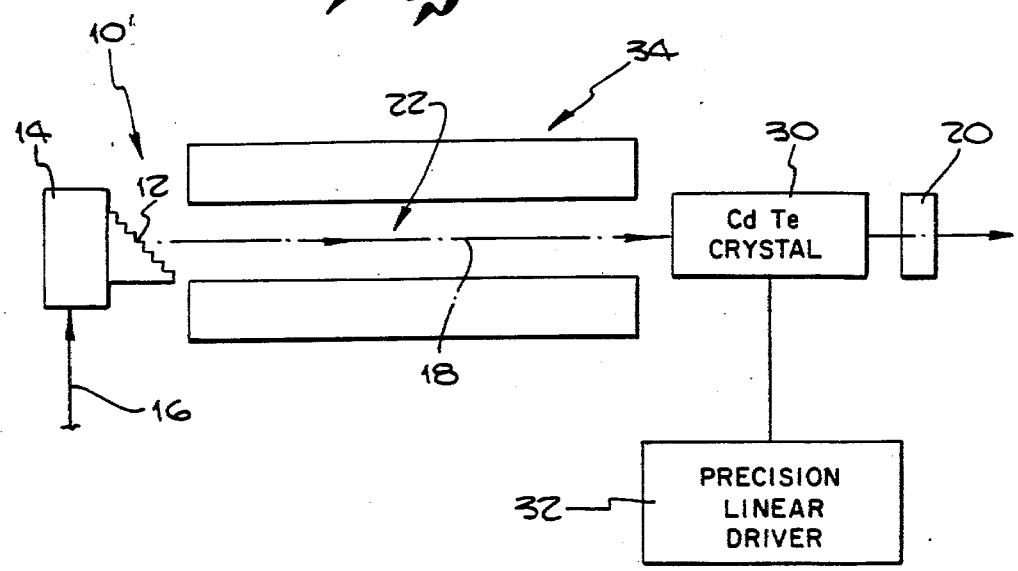
FIG. 4 is a simplified drawing showing the apparatus employed in the present invention for modulating a laser inside the laser cavity.

The frequency modulation of the laser, as described in detail in Reference [6], is accomplished by the use of an internal modulator. FIG. 4 is a diagram showing the basic configuration of the intracavity modulation scheme of the present invention.

The frequency of the laser is changed by electrically modulating the refractive index of a Cdte crystal 30 within the laser cavity. A Littrow grating 12 is used to keep the laser on the desired line.

It is easy to show that the change in frequency, $\Delta \nu$, of the optical field is given by the change in the refractive index of the crystal, by the relationship, $$\frac{\Delta \nu}{\nu} = \Delta n \frac{2l}{C} \nu_{fsr} \tag{4}$$

where $\nu$ is the laser frequency, $\nu_{fsr}$ is the free spectral range, or mode spacing, l is the length of the crystal, and C is the speed of light. In this expression $\Delta n$, the change in refractive index is given by [7] as $$\Delta n = \frac{n_o^3 r E}{2}$$

where $n_o$ is the refractive index of the crystal, r is the corresponding electro-optic sensor element, and E is the applied electric field.

By using the ratio of the applied voltage V and the modulator height d for the electric field, we get $$\frac{\Delta \nu}{\nu_{fsr}} = \frac{V}{\left(\frac{\lambda}{n_o^3 r} \cdot \frac{d}{l}\right)} \tag{5}$$

The term in brackets in Equation (5) is recognized as $V\pi$, whence $$\Delta \nu = \frac{V}{V_\pi} \nu_{fsr} \tag{6}$$

For a linear chirp, we set the applied voltage to be a ramp of period T such that Equation (6) becomes $$\Delta \nu = \mu t \quad |t| < T/2$$

where $$\mu = \frac{\left[\frac{\Delta V}{\Delta t}\right]}{V_\pi} \nu_{fsr} = \text{constant}$$

The phase, $\phi_n(t)$, of the heterodyne signal in Equation (3) is, $$\phi_n(t) = 2\pi \int_o^t \Delta \nu(t')\, dt' = 2\pi \frac{\mu t^2}{2} \tag{7}$$

Substituting Equation (7) into (3), we obtain for the heterodyne signal, $$S_h(t) = A_h(t)\, \exp j\left[\omega_n t + 2\pi \frac{\mu t^2}{2} + C.C.\right] \tag{8}$$

-continued for $|t| < T/2$, where we set $$A_h(t) = A_L A_S(t)$$

$$\omega_h = \omega_S - \omega_L$$

Pulse Compression

The filter that compresses the chirp has a linear time delay vs. frequency characteristic of the opposite sense to the linear FM sweep. The principles of linear FM sweep matched-filters, are discussed by Cook [4]. Functionally, the time delay of the filter may be expressed by $$t_d = 2K(\omega - \omega_1) + b \qquad (9)$$

The associated filter phase shift is $$\beta_f(\omega) = \int t_d d\omega = K(\omega - \omega_1)^2 + b\omega + C_2 \qquad (10)$$

Assume that the signal at the input of the filter is as in Equation (8) with $$A_h(t) = \text{constant}$$

and $$S_h(t) = 0 \text{ while } |t| > T/2$$

Then we have a FM sweep rectangular pulse of duration T.

$$\omega_h - (2\pi)\frac{\mu T}{2} \leq \omega \leq \omega_h + (2\pi)\frac{\mu T}{2} \quad \Delta\omega = (2\pi)\mu T$$

Figure 5:
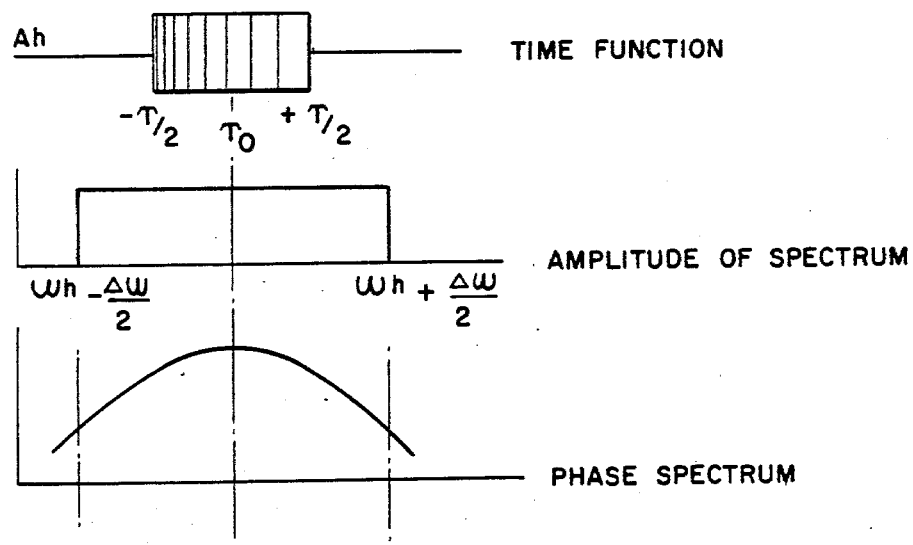
FIG. 5 is a simplified drawing of waveforms occurring in the present invention.

The amplitude of the spectrum is also rectangular shaped. However, the phase contains the well known quadrature given by $$\phi_h(t) = \frac{\mu t^2}{2}$$

as shown in the lowermost plot of FIG. 5.

If the constants $\mu$ and K are properly matched, mainly that $(2\pi)\mu K = \frac{1}{2}$, then the spectrum at the compression filter will consist of the same rectangular amplitude distribution, however the quadratic term of the phase will be cancelled. For this case, the compressed pulse is given by [4] as, $$g(t) = 2\sqrt{\mu} \frac{\sin\left[\frac{2\pi\mu t}{2}(T - |t|)\right]}{2\pi\mu t} \cos \omega_h t \text{ for } |t| < T$$

As expected, the shape of the compressed pulse is of the form (sin x)/x, since its frequency distribution is rectangular with linear phase, as mentioned above. The spacing between zeros of the envelope is $2/\Delta f$, and the peak amplitude is $(\sqrt{T\Delta f}) \times$ (filter attentuation). The pulse width, measured at 4 dB down from the peak amplitude is $\tau_p = 1/\Delta f$.

Figure 6:
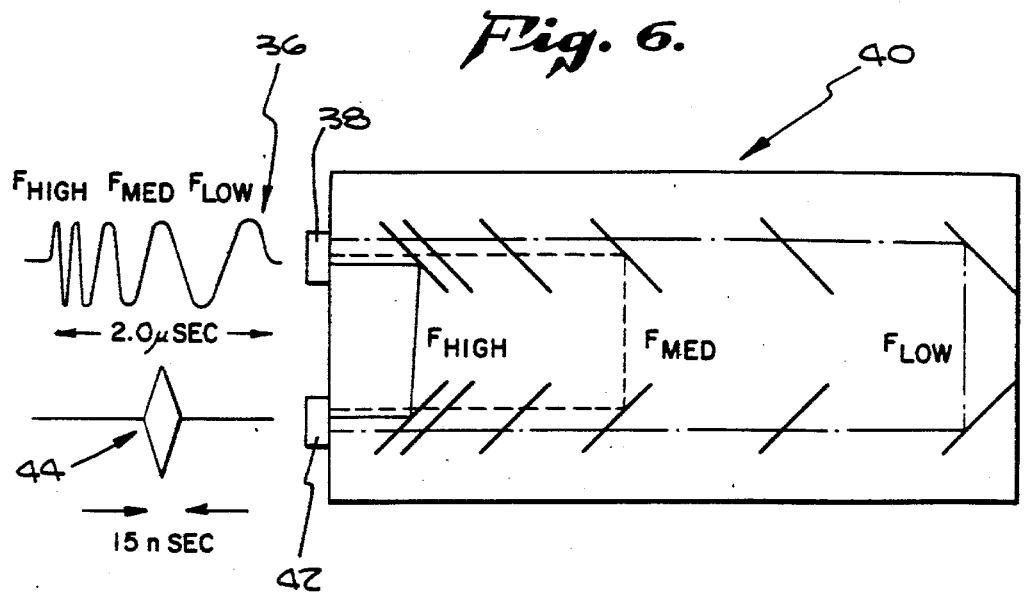
FIG. 6 is a simplified drawing showing the effect of the Surface Acoustic Wave delay device employed in the present invention in converting a chirped electrical signal into a pulsed electrical signal.

The operation of the Surface Acoustic Wave device is shown in simplified form in FIG. 6. The chirped signal, generally indicated as 36, comprising, for simplicity, "HIGH", "MED", and "LOW" components is applied to the input transducer 38 of the SAW, generally indicated as 40. The different frequencies have individual "resonance" points at which they are reflected across and back towards the output transducer 42. If the "chirp" or change in frequency along the signal 36 is linear, the various time delays result in all the various frequency components arriving at the output transducer 42 substantially simultaneously, resulting in the single output pulse, designated as 44, as desired. By contrast, a non-linear chirp has its energy spread by the SAW 40, producing an unusable output. It is for this reason that linearity is critical and why the technique with an intra-cavity chirped laser was previously thought of as impractical by others in the art.

$T\Delta F$ is the time-bandwidth product, also designated as the compression factor, yielding $$\frac{P_o}{P_i} = T/\tau_p = T\Delta f \qquad (11)$$

where $P_o$ is peak compressed power and and $P_i$ is not compressed. The (sin x/x) shape of the compressed pulse gives rise to sidelobes extending on either side of the compressed pulse. The first and largest of these is 13.5 db below the peak. In ranging systems, where the reflection amplitude of targets may have a large dynamic range, the sidelobes will obscure low level returns and must be eliminated.

Sidelobe Rejection

To minimize the effects of thesse unwanted signals, various approaches for controlling the spectrum modulus have been considered [4]. These are in the general area of weighting, or shaping, the spectrum by frequency domain filtering or time domain envelope shaping. In essence, the object is to taper the ends of the rectangular frequency distribution mentioned earlier, because from Fourier analysis, we know that abrupt edges on the frequency spectrum, create sidelobes in the time domain. Filters used for this purpose are designated as weighting filters. In the next section the use of these filters and their effects is exemplified.

Experimental Setup

Figure 7:
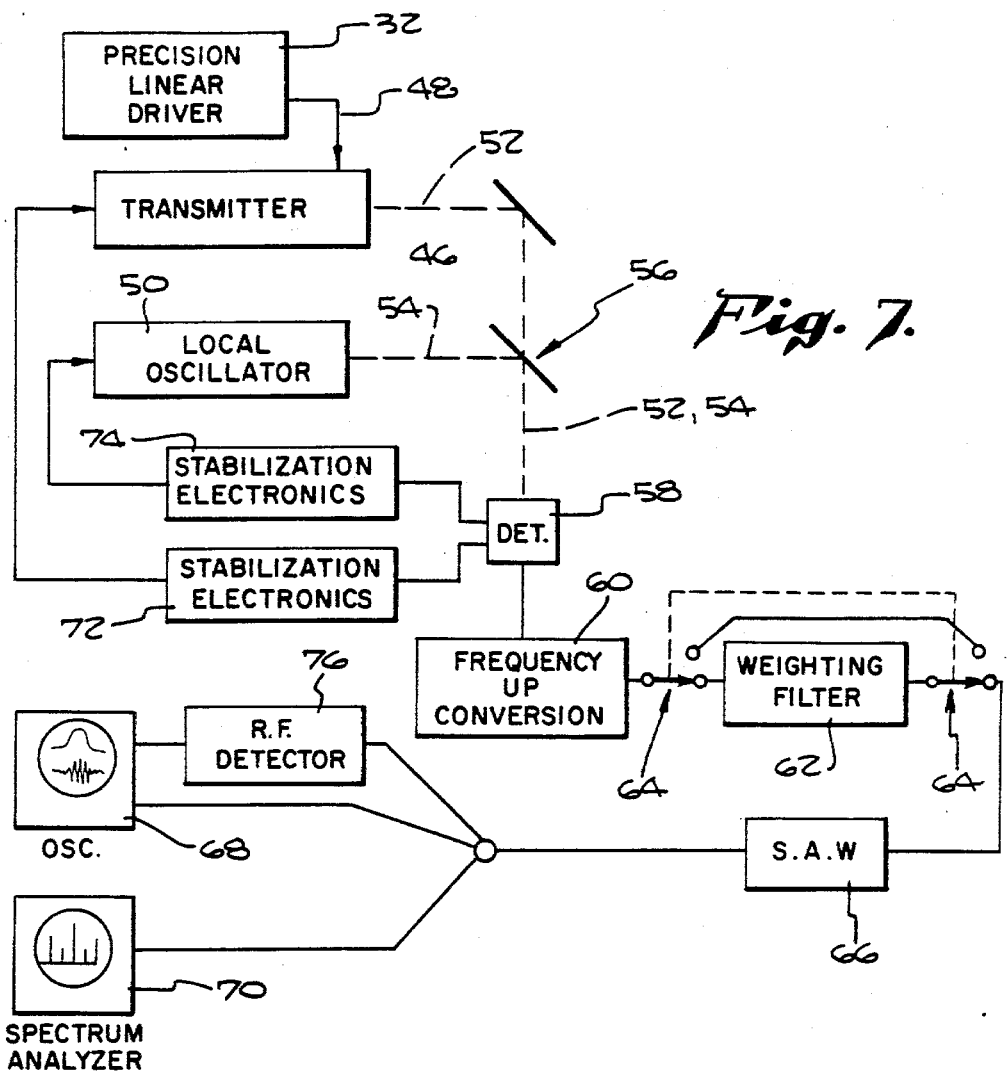
FIG. 7 is a simplified block diagram of the system used by Applicants to test the present invention.

The experimental test setup used by Applicants is shown as a simplified block diagram in FIG. 7. As previously described, the transmitter laser 46 is modulated by a CdTe FM cut crystal, placed inside the laser resonator. The voltage applied to the modulator by driver 32 at input line 48 consists of a highly linear triangular waveform ($\pm 0.5\%$ @ 750 $V_{pp}$), which in turn yields an upward and then downward frequency sweep of approximately 100 MHz. The period of the triangular waveform is 4 microseconds, where the upaward and downward chirp are both of 2 microseconds width.

The local oscillator 50 is a laser of substantially identical construction to the transmitter laser 46, with the exception that the local oscillator 50 does not include the modulating crystal. The local oscillator laser 50 is frequency locked to a frequency which is offset from the center frequency of the transmitter laser by 100 MHz. The beams 52, 54 from the transmitter laser 46 and local oscillator 50, respectively, are combined at the beamsplitter 56. The combined beam 52, 54 impinges on and is detected by a (HgCd)Te, nitrogen cooled, photodiode detector 58, which, in effect, behaves as a square-law detector.

The electrical a.c. output of the detector 58 is of the form of Equation (8), where for a single chirp pulses $\mu = 50$ MHz/$\mu$s, and T=2 $\mu$s. The heterodyne signal is frequency up-converted at 60 from 100 MHz to 500 MHz to correspond to the center frequency of the matched filter 66. A weighting filter 62 was used in one set of measurements, to reduce the sidelobes on the compressed pulse. The chirp signal is selectively fed via switch 64 to the weighting filter 62. The chirp signal is then fed to the matched-filter 66 to be compressed. The filter 66 consists of an ultrasonic wave dispersive delay line, the principles of which are described in Reference [4]. The dispersive delay line is a Surface Acoustic Wave (SAW) device, with a chirp dispersive slope of 50 MHz/$\mu$s. A compressed pulse from the SAW 66 is then selectively observed in the form desired at the oscilloscope 68 and spectrum analyzer 70. RF detector 76 gives an envelope of the RF signal, eliminating the carrier.

An important feature of the illustrative circuits iss the use of matched, grating controlled, high-pressure $CO_2$ lasers at 46, 50 coupled with the feedback loops comrising the stabilizing electronics circuits at 72 and 74 connected between the detector 58 and the piezoelectric translators of the lasers 46, 50, respectively. The circuits 72, 74 adjust the drive level of the respective piezoelectric translators as a function of the frequency of the beam components 52, 54 sensed at the detector 58 whereby the basic difference frequency of the lasers 46, 50 is maintained exactly (i.e., in the tested example), at 100 MHz, with the frequency of the local oscillator 50 being held to a frequency precisely 100 MHz from the center frequency of the transmitter laser 46.

Component Description

The system of the tested embodiment has grating controlled, high-pressure $CO_2$ waveguide lasers at 46 and 50, which were made by the assignee of the present invention, Hughes Aircraft Company. The cavity was exited by an r.f. source, which is powered by a 24 V power supply. The FM cut crystal of the transmitter 46 is a 1.5×1.5×50 mm CdTe crystal, with electrodes extending along two opposed sides of the crystal, produced by II-VI Corp. The SAW devices 66 were produced by the Ground Systems Group of the Hughes Aircraft Company.

Results

Figure 8:
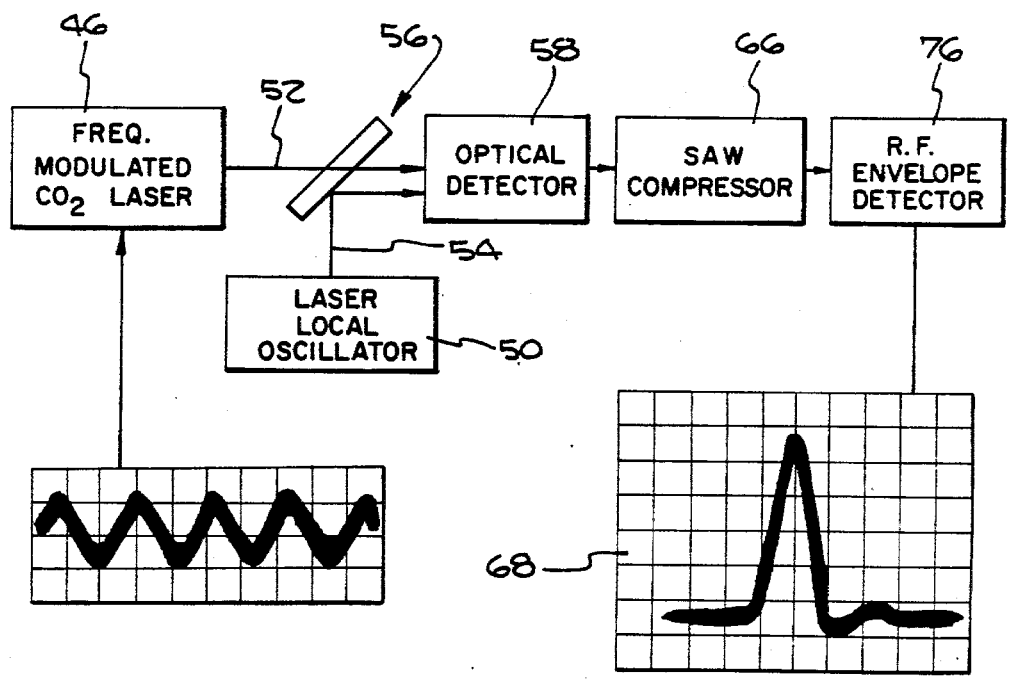
FIG. 8 is a simplified drawing partially in block form showing the triangular waveform applied to the modulating crystal of the transmitter and the detected r.f. pulses from the envelope detector in the test system of FIG. 7.

FIG. 8 shows schematically in block form the triangular waveform applied to the FM crystal of the transmitter 46 and the detected r.f. pulses from the r.f. envelope detector 76, coming from the output of the SAW device 66. Since only the upward chirp in the SAW 66 is used in this test setup, only one side of the triangular FM sweep yields a compressed pulse. The portion of the signal which has a reverse chirp direction, becomes dispersed in the SAW 66 as with a non-linear chirp as previously described.

Figure 9:
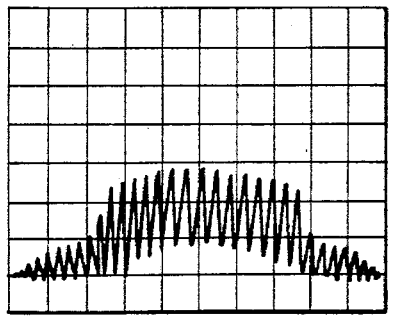
FIG. 9 is a drawing of the output waveform of the FM sweep.

The bandwidth of the FM sweep can be observed in the drawing of an output waveform of FIG. 9, to be nearly 100 MHz. This would yield a base width (between the first two nulls of the (sin x)/x of the compressed pulse of 2/$\Delta$f=20 ns. This corresponds to the drawing of an observed pulse shown in FIG. 10. The asymmetry of the shape and amplitude of the first sidelobes is attributed to a slight phase distortion, or deviation from linearity of the FM sweep. The source of this deviation may be attributed to non-linear terms in the relations $\Delta\nu = (\Delta V)$ [8]. Reference [4] (Chapter 11) discusses the effects of some typical distortion on matched-filter signals.

In order to quantify the amount of distortion of the signal, hence the degradation of the compressed pulse, we make use of Equation (11). In the non-ideal case where distortions are present, Equation (11) becomes an inequality. The compression factor is given by T$\Delta$f, which is the ideal case; thus, in general one finds that $$\frac{T}{\tau p} \leq T\Delta f \qquad (12)$$

Figure 11:
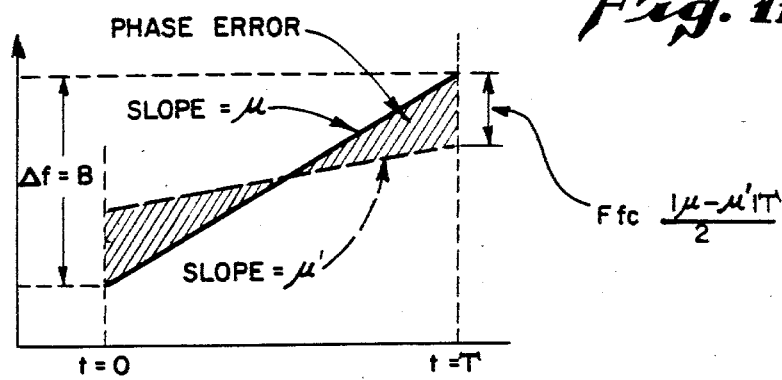
FIG. 11 is a graph of the linear delay mismatch condition encountered.

The amount of phase deivation may be used to quantify the mismatch expressed by Equation (12). The Applicants have considered the case when the linear delay function of the receiver does not correspond exactly to the FM sweep of the pulse. This is done because simple analytical expressions for the phase deviations can be attained readily. This condition, referred to as linear delay mismatch, is illustrated in FIG. 11. The chirp pulse of width T is frequency swept at a rate $\mu'$, represented by the broken line. The SAW (matched-filter) requires a FM sweep of $\mu$, represented by the solid line. The frequency mismatch at the band-edge is, $$f_e = \frac{|\mu - \mu'|T}{2} \qquad (13)$$

The shaded area represents the total phase error of the chirp pulse. In this linear case, one finds that the band-edge deviation is $$\phi_e = \frac{\pi |\mu - \mu'| \tau^2}{4} \qquad (14)$$

We define the mismatch factor as $$\gamma = \frac{|\mu - \mu'|}{\mu} \qquad (15)$$

such that Equation (14) becomes $$\phi_e = \frac{\pi \gamma (T\Delta f)}{4} \qquad (16)$$

where the relation $\mu T = \Delta f$ is used.

Figure 12:
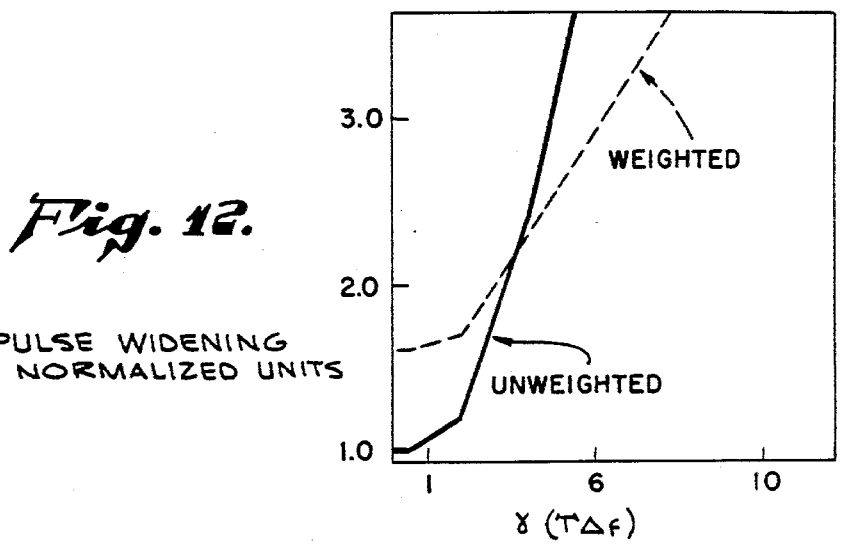
FIG. 12 is a graph giving the pulse widening degradation.

FIG. 12 gives the pulse widening degradation, as derived from the data of Klauder et al, [9], where the degradation is plotted as a function of phase deviation in terms of $\gamma(T\Delta f)$.

Figure 10:
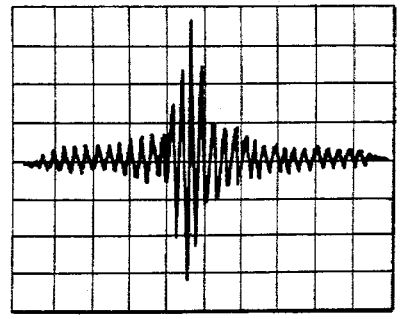
FIG. 10 is a drawing of the observed pulse.

The unweighted pulse shown in FIG. 10, was measured to have the following parameters:

$$T = 2.1 \ \mu s, \text{ compressed pulse width } \tau = 15 \ ns \qquad (17)$$

$$\Delta f = 95 \ MHz$$

$$\frac{T}{\tau} = 140 < T\Delta f = 199$$

The amount of pulse widening, due to mismatch is $$\frac{T\Delta f}{(T/n)} = 1.42$$

Using the graph in FIG. 12, we obtain for pulse widening degradation $\gamma(T\Delta f) \simeq 2.5$ This corresponds to the general appearance of the unweighted pulse given by Klauder et al. The mismatch factor is $$\gamma = \frac{2.5}{T\Delta f} \simeq 1.3 \times 10^{-2} \qquad (18)$$

As it was mentioned earlier, the sidelobe amplitude, for the unweighted case, lies at −13.5 db. For most uses of a laser radar system, one finds that it is desirable to reduce the sidelobe amplitude, even at the price of increasing the pulse width. This may be done by what is called weighting, where the edges of the frequency band are tapered. As pointed out in Reference [9] the effect of weighting not only reduces the sidelobe amplitude, but also improves the pulse shape when a mismatch is present.

Figure 13:
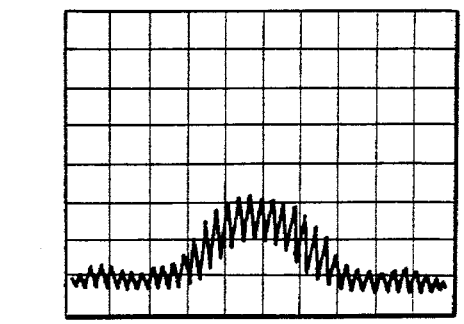
FIG. 13 is a drawing of the display of the frequency spectrum of the weighted pulse.

In our case, the transversal filter was used at 62 with a transfer function of, $$H(\omega) = 1 + \cos\left[\frac{(\omega_0 - \omega)2\pi}{\Delta\omega}\right] \qquad (19)$$

where $\omega_0$ is the center frequency and $\Delta\omega$ is the bandwidth of the chirp. FIG. 13 is a drawing of the display of the frequency spectrum of the weighted pulse, which is essentially the spectrum shown in FIG. 9 of the unweighted pulse multiplied by the transfer function of the filter, $H(\omega)$, given in Equation (19). FIGS. 14 and 15 show the r.f. pulse obtained at the output of the SAW 66, and the demodulated pulse, respectively, which are to be used for signal processing. The slight overshoot observed at the end of the demodulated pulse is an artifact of the r.f. detector.

The parameters measured for this pulse are

T=2.1 μs

τ=20 ns

Δf=95 MHz

Δf₃ dB=45 MHz where $\Delta f_{3\ dB}$ is the bandwidth above half-power point. As expected, similar to Equation (17), we obtain $$\frac{T}{\tau} = 105 < T\Delta f = 199 \qquad (20)$$

The amount of pulse widening is $$\frac{T\Delta f}{(T/\tau)} = 1.9$$

According to the graph in FIG. 12, this corresponds to a mismatch of, $\gamma(T\Delta f) \simeq 2.7 \qquad (21)$ where the weighted curve was used this time. The mismatch factor is $$\gamma = \frac{2.7}{(T\Delta f)} = 1.36 \times 10^{-2} \qquad (22)$$

which, as expected, corresponds to the mismatch factor calculated in Equation (18), since the same pulse was used for the weighted case. However, as mentioned earlier, for the same amount of phase distortion, the weighted pulse usually has higher quality shape and lower sidelobe level than the unweighted case.

CONCLUSIONS

Phase Distortion and Mismatch

In the system described above, a compression factor, $T\Delta f$, of near 200 was used. It was found that the mismatch factor, $\gamma$, is about $1.35 \times 10^{-2}$. For a compression of 200, this yields a phase error at the band-edges of about (from Equation (16))

$$\phi_e = \pi\gamma(T\Delta f)/4 \simeq \frac{\pi}{1.5}$$

Since the slope of the ramp yielding the FM sweep was adjusted for optimum pulse shape, the mismatch is due to other non-linearities at either the frequency modulator crystal or the response of the laser. The Applicants are at present investigating this source of distortion such that it may be reduced further. This will allow even further narrowing of the compressed pulse and increase the resolution of the ranging capabilities.

Laser Radar System

The signal processing technique for range and Doppler measurements is similar to the one described by Hulme et al [5].

Consider a target at a distance R from the radar.

The range time would be $$t_r = 2R/C \qquad (23)$$

where C is the speed of light. Assuming that the target has a radial velocity, Vr, the Doppler shift, $$f_d = \frac{2V_r}{C} f_{laser},$$

will cause an additional delay of, $$t_{d(+)} = -f_d/\mu \qquad (24)$$

Thus the total measured time will be $$t_{(+)} = t_r + t_d \qquad (25)$$

The transmitter emits an upward and downward chirp, where the SAW device only compresses one. By using a second SAW device with the same chirp rate characteristics, however opposite in sign $\mu_{(-)} = -\mu_{(+)}$, then the delay produced by the Doppler effect will also be opposite in sign, i.e., $$t_{d(-)} = +f_d/\mu \qquad (26)$$

and the total measured delay will be $$t_{(-)} = t_r + t_{d(-)} = t_r - t_{d(+)} \qquad (27)$$

Thus in order to obtain the correct parameters, one uses the relationships (26) and (27)

$$t_r = \frac{[t_{(+)} + t_{(-)}]}{2} \quad (28)$$

and $$t_d = \frac{[t_{(-)} - t_{(+)}]}{2}$$

FIG. 16 shows a graphical description of Equation (28).

The Applicants have shown that the positions of a modulated compressed pulse may be determined in time with an rms uncertainty of about 2 ns. Thus the range time will have an uncertainty $$\delta t_r = \frac{2\sqrt{2}}{2} \text{ ns,}$$

which yields $\delta R \approx 0.22$ meters.

The Doppler is given by $$\delta f_d = \delta t_d \, \mu = \frac{2 \delta V_r}{c} f_{laser}$$

Since $\delta t_d$ is also about 2 ns, then the accuracy of the radial velocity is $$\delta V_r = \frac{\delta t_d}{2} \frac{\mu c}{f_{laser}} = \frac{\delta t_d}{2} \mu \lambda_{laser}$$

For a $CO_2$ laser, $$\lambda_{laser} = 10.6 \times 10^{-6} \text{ m}$$

then $$\delta V_r \approx 0.37 \text{ m/s}$$

Figure 17:
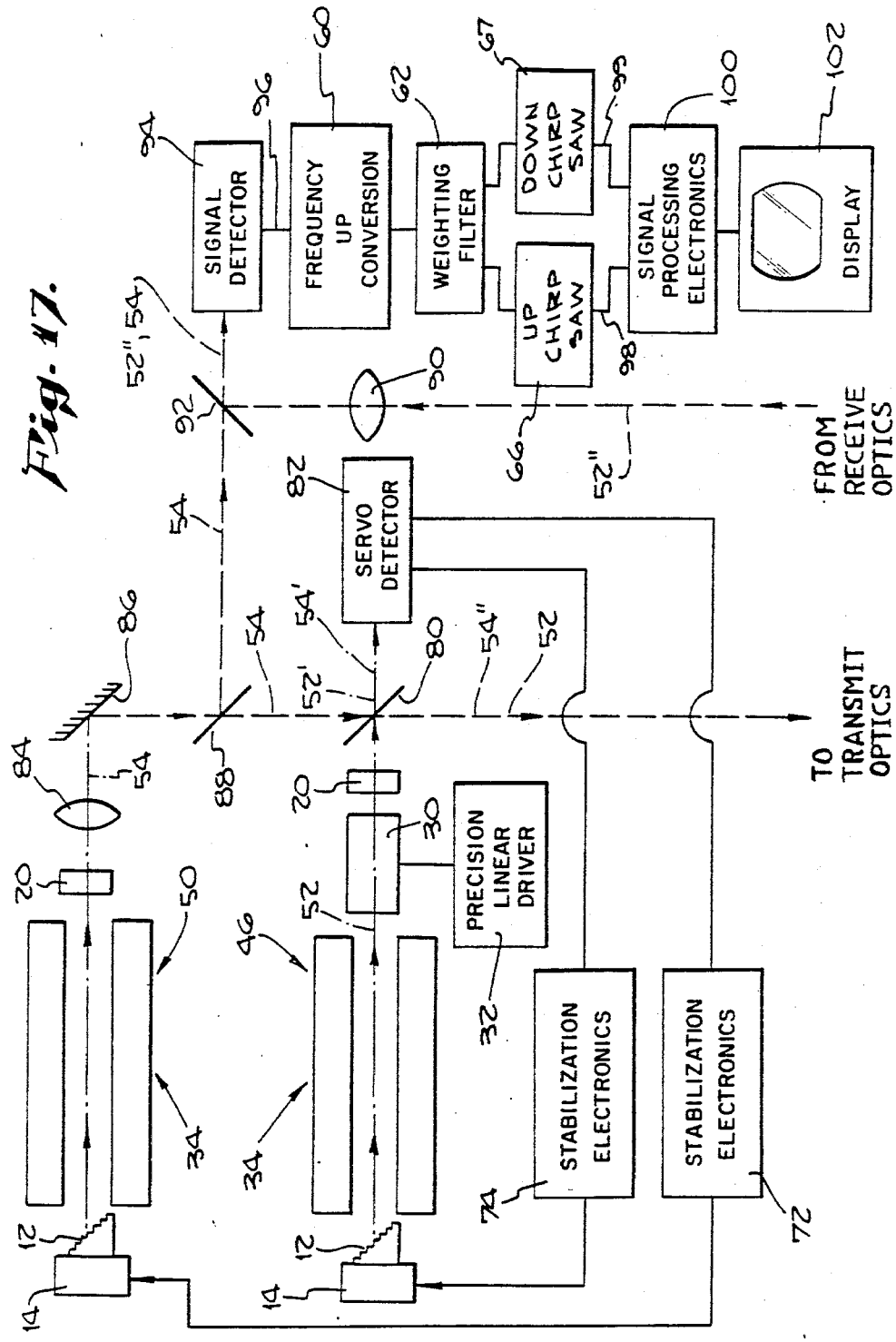
FIG. 17 is a simplified drawing of a laser radar system according to the present invention.

A laser radar system according to the present invention is shown in simplified form in FIG. 17. The radar system, generally indicated at 78, employs many of the same components as the test bench apparatus of FIG. 7 and, therefore, no detailed explanation of those portions will be duplicated at this point. The local oscillator laser 50 may operate at a frequency which is displaced from the center frequency of the transmitter laser 46 by an arbitrarily selected convenient frequency such as 100 MHz. The light beam 52 from the transmitter 46 as modulated by the CdTe FM cut crystal 30 strikes the dielectric beamsplitter 80. In one specific system, using the components as described herein the signal 52 shifted plus and minus 47.5 MHz from its center frequency, at the rate of 250 KHz, at which the crystal 30 is driven. Beamsplitter 80 allows approximately five percent of the beam 52, labeled 52', to pass therethrough and strike the servo detector 82. The remaining ninety-five percent of beam 52 passes through whatever additional means are necessary to be emitted as the transmitted radar beam, as so labeled. The beam 54 from the local oscillaator 50 passes through lens 84 to be focused onto the mirrored surface 86, from whence it is directed to dielectric beamsplitter 88. Like beamsplitter 80, beamsplitter 88 reflects approximately ninety-five percent of beam 54 and passes the remaining five percent, labeled 54', which strikes beamsplitter 80, from which ninety-five percent joins the five percent of the beam 52' from the transmitter 46 in striking servo detector 82 as a combined beam 52', 54'. The remaining five percent of the five percent of beam 54', labeled 54", is mixed with the transmitted beam 52. The amount of energy in beam 54" is so negligible as to be of no consequence. Servo detector 82 performs the function of developing the input signals to the stabilization electronics 72, 74 which are connected to the piezoelectric translators 14 of the lasers 46, 50 to maintain laser 34 exactly at its preselected base or center frequency and to maintain local oscillator 34 at its desired frequency 100 MHz from the center frequency of laser 34.

The portion of the transmitted beam 52 which is scattered by a target and received is labeled 52". This received beam passes through lens 90 to be focused on dielectric beamsplitter 92, where it is mixed with the beam 54 from the local oscillator 50 to form a combined beam 52", 54 which impinges upon the signal detector 94. Those skilled in the art will recognize that in an actual production radar, the transmitted and returned beams will share a common path for at least a portion of their travel, employing a polarizing beamsplitter and a quarter waveplate. Detector 94 converts the light beam energy striking it into a corresponding electrical signal on its output line 96, reflecting the combined beam 52", 54. With the local oscillator 50 operating at a frequency 100 megacycles per second offset from the center frequency of the transmitter laser 34, the output at 96 from the signal detector 94 will be approximately 100 MHz plus and minus 47.5 MHz, or 52.5 to 147.5 MHz.

The electrical signal then passes through the frequency upon conversion circuit 60, the weighting filter 62, and a pair of surface acoustic wave delay devices 66, 67, all previously described in detail. The two surface acoustic wave devices 66 and 67 in their operating frequency ranges, including the range between 450 and 550 MHz, have delay vs. frequency characteristics which match the frequency shift vs. time characteristics of the transmitter 34. Accordingly, in order to locate the frequency swept signals within the operating range of the particular SAW's which are employed, the circuit 60 shifts the output from signal detector 94 up to a center frequency of 500 MHz, with the actual frequency range extending from about 452.5 to about 547.5 MHz. As is known, two SAW's (one for the up-chirp and one for the down-chirp) are employed to provide Doppler frequency shift information. The outputs 98 and 99 of the SAW's 66, 67 comprise the pulse waveforms to be used as the waveform for radar signal processing by electronics 100 in the usual manner. The output from the signal processing electronics 100 can then be used to drive a display 102 for visual interpretation by a radar operator or digitized for use in automated target acquisition sensors as is more typically the case presently.

The showings of the driver 32 for the modulating crystal 30 in the earlier figures of the drawing, including FIG. 17, have been schematic in nature, and the details of the actual circuitry employed and the application of signals to the CdTe FM cut crystal will now be set forth.

As shown in FIG. 17, for example, the crystal 30 is within the laser cavity, and the application of voltage to plates on opposite sides of this electrooptical crystal will change the refractive index and the speed of the signal passing through the crystal, thus changing the effective length of the cavity and the frequency of the laser. Now, using the CdTe FM cut crystal, when a positive voltage is applied across between the two electrodes on opposite faces of the crystal, the effective cavity length and the resultant frequency shifts in one direction, and when a negative voltage is applied across the crystal between the same two electrodes, the effective cavity length and frequency shifts in the opposite sense.

Figure 18:
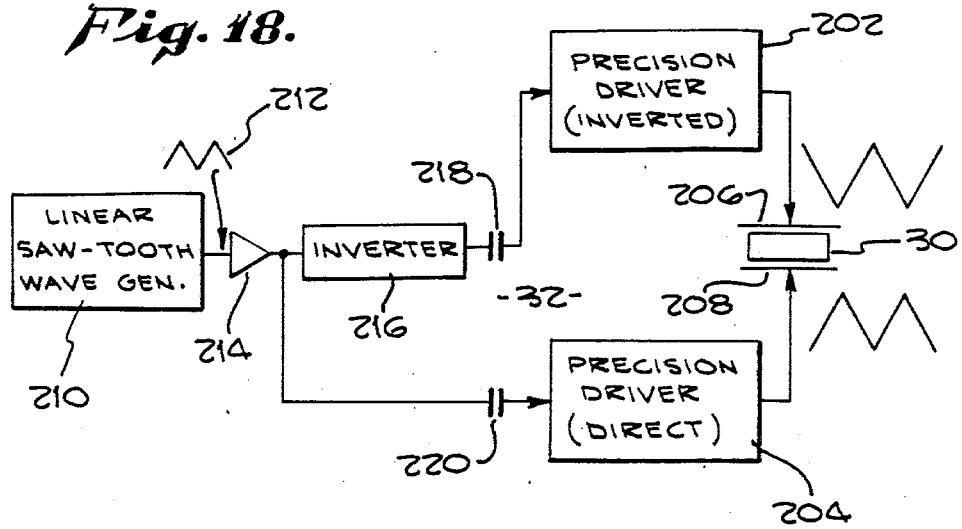
FIG. 18 is a block diagram showing the driving of the modulating crystal for the laser from both electrodes.

With that background, reference is made to FIG. 18, showing the driver system 32 including the two precision drivers 202 and 204 applying direct and inverted linearly rising and falling voltages to one electrode 206 and the other electrode 208, respectively, of the crystal 30. A linear sawtooth waveform generator provides the input waveform 212, having a repetition rate of 250 KHz with deviations from linearity preferably less than one-half of one percent, or less than two percent. This signal 212 is applied from the amplifier 214 through the inverter 216 and coupled by capacitor 218 to the inverted signal driver 202; and is coupled by capacitor 220 to the direct driver 204.

Figure 19:
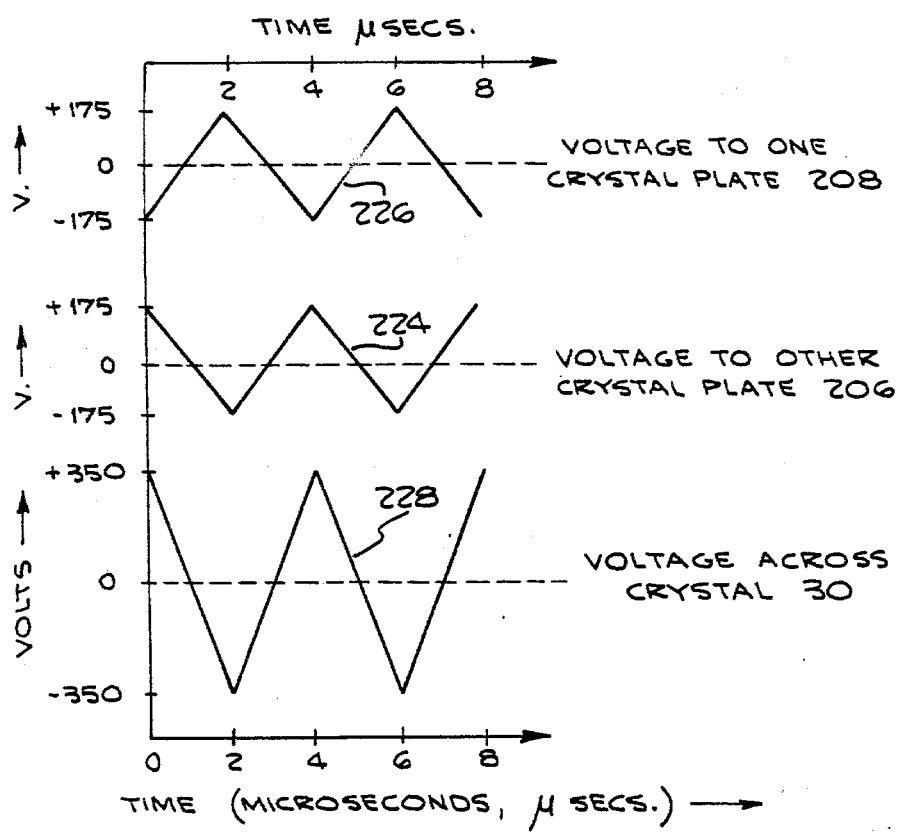
FIG. 19 shows waveforms relating to the application of voltages to the modulating crystal.

The linear waveforms applied to the two electrodes 206 and 208 of crystal 80 are shown in FIG. 19. The two out-of-phase sawtooth waves 224 and 226 are applied to electrodes 206 and 208, respectively; and the total voltage across the crystal is shown by plot 228. As may be observed in FIG. 19, there is a swing of 700 volts from plus 350 to minus 350 volts across crystal, and for the parameters set forth hereinabove this provides a total frequency swing of 95 MHz, or nearly 100 MHz. The positive and negative peak output voltages from driver circuits 202 and 204 may be increased to 187 or 188 volts, increasing the peak-to-peak swings applied to crystal 30 to 750 volts, and the total frequency swing to 100 MHz.

Figure 20:
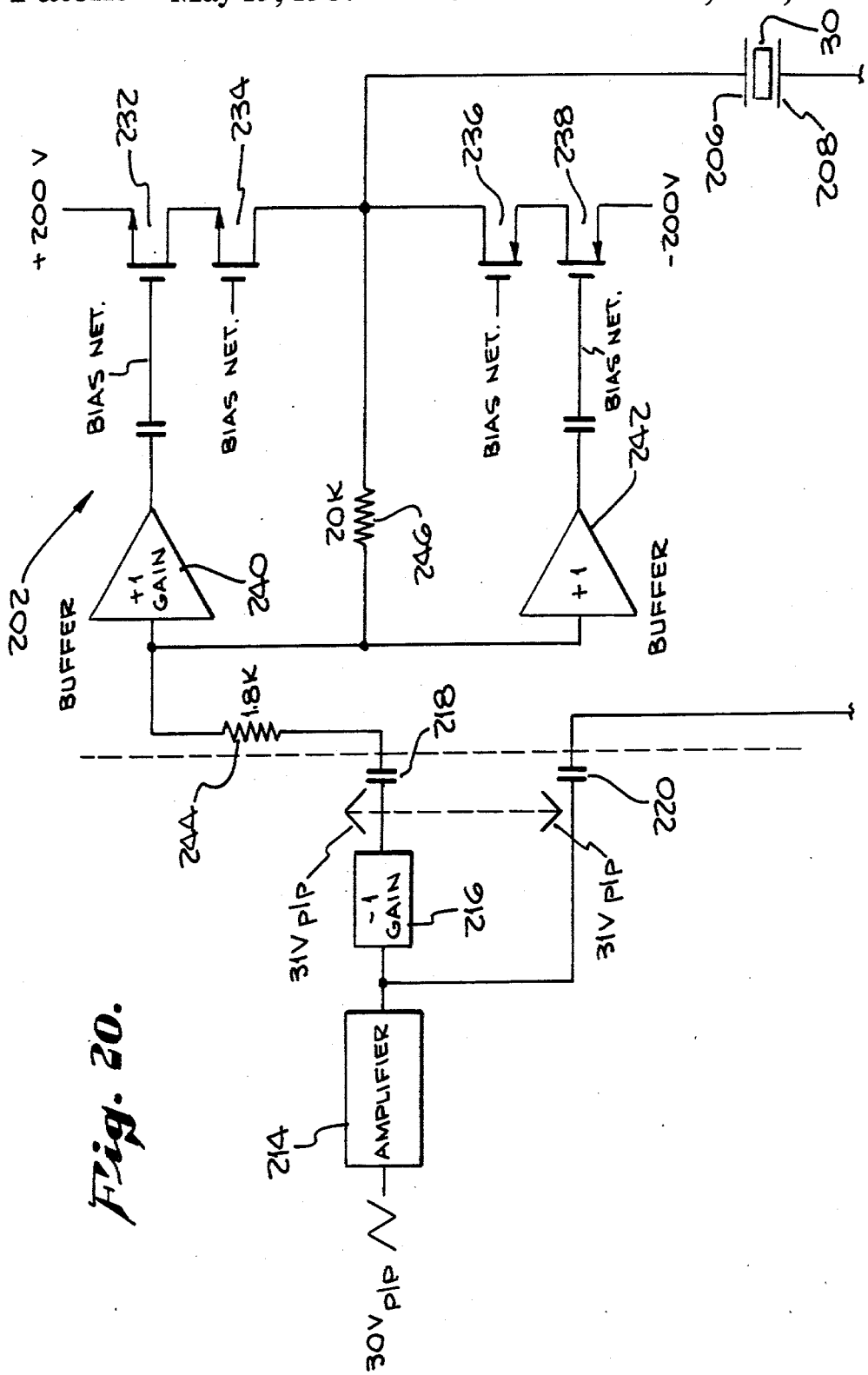
FIG. 20 is a simplified electrical circuit relating to a portion of FIG. 18.
Figure 24A:
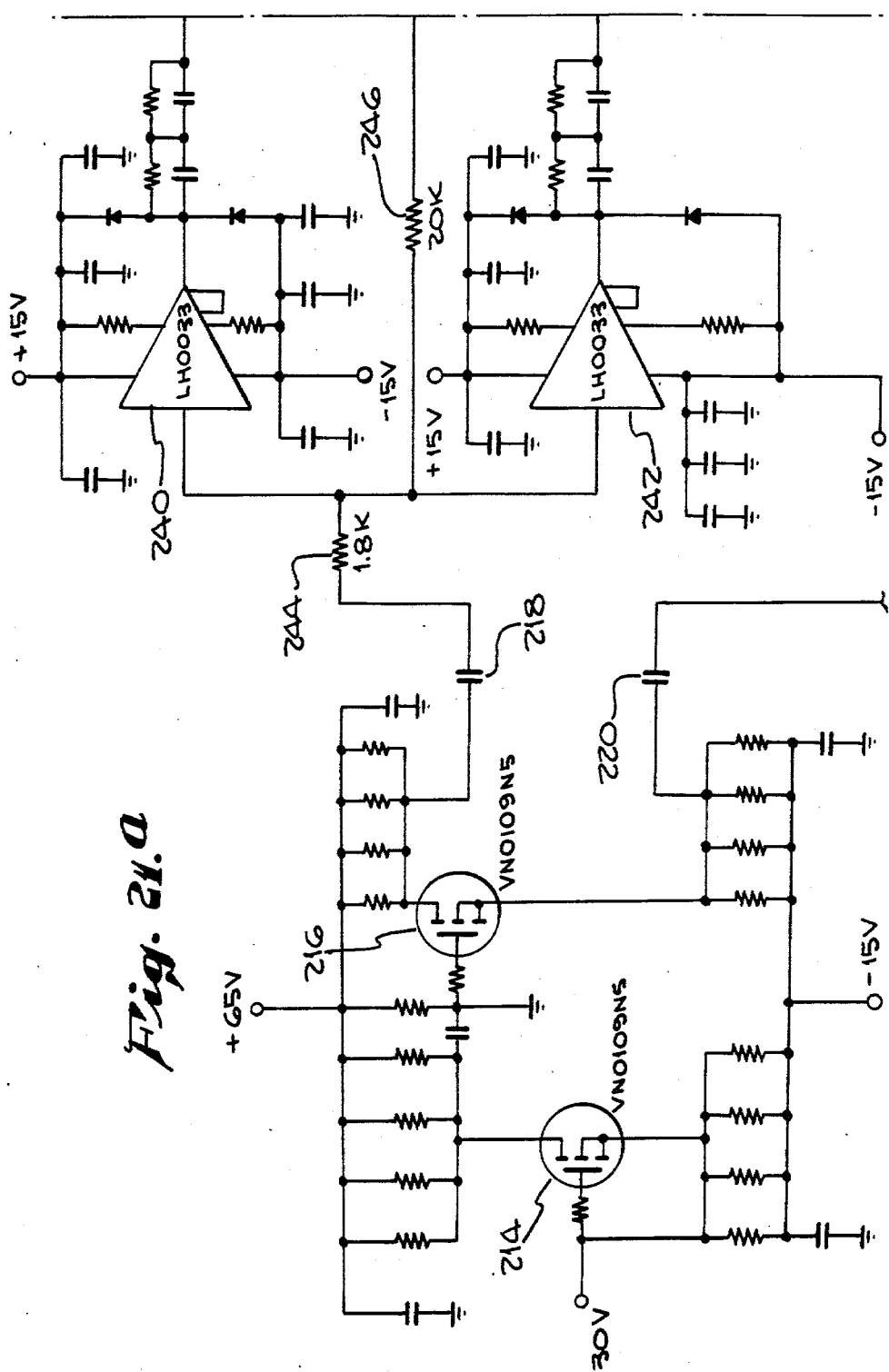
Figure 24B:
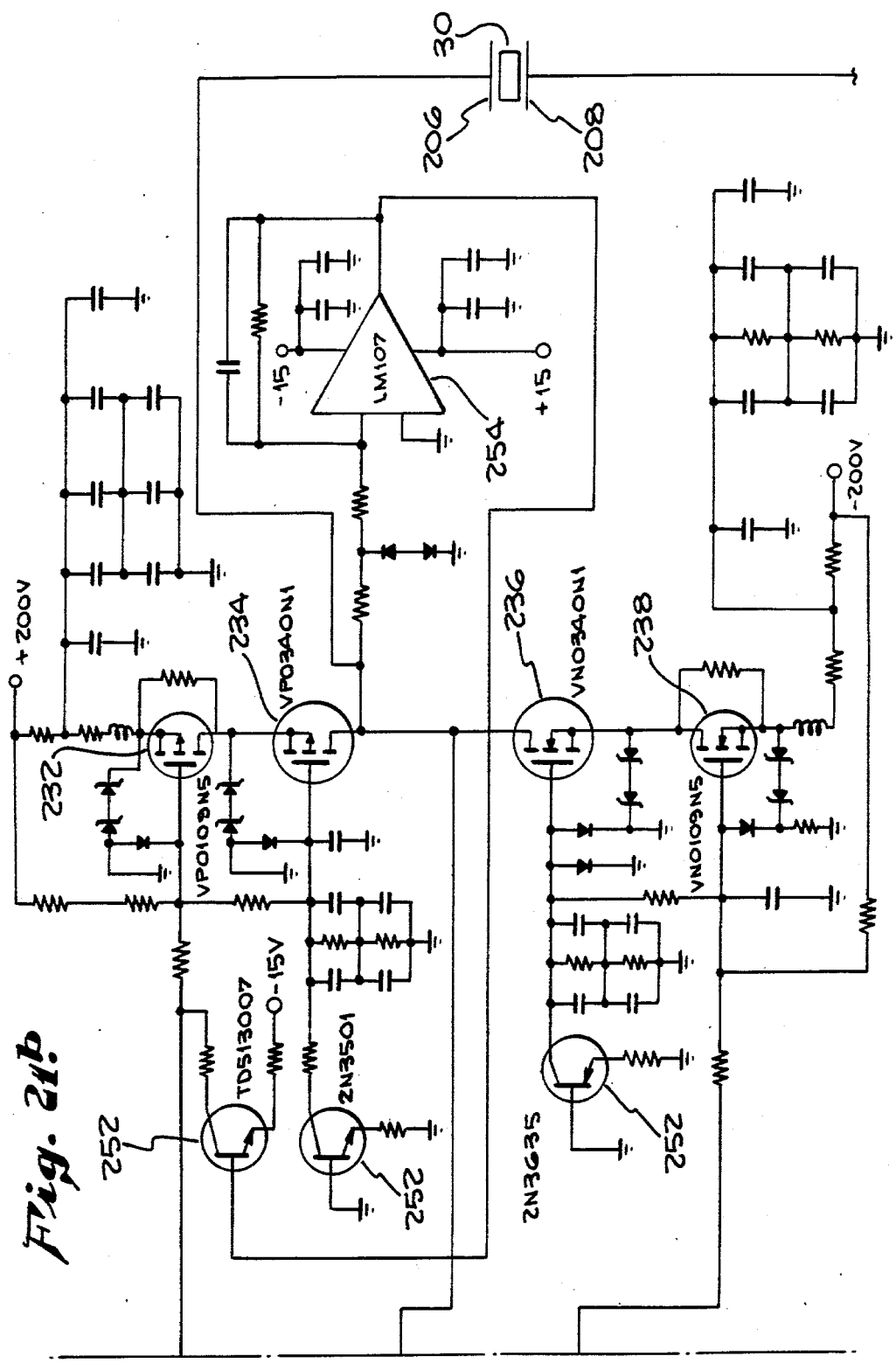

In order to obtain the voltages noted above with high linearity and at a frequency of 250 KHz, the circuits shown schematically in FIGS. 18 and 20 and in detail in FIGS. 21a and 21b were developed. Referring now to FIG. 20, the circuit components which were shown in FIG. 18 are shown with identical numbers in FIG. 20. FIG. 20 only includes driver 202, and not driver 204 which is essentially a mirror image of circuit 202, with the voltages reversed in sign, and the polarities of the field effect transistors also reversed (p-type for n-type, etc.)

FIG. 20 includes four field effect transistors 232, 234, 236 and 238 arranged in a cascode circuit configuration. Two buffer circuits 240 and 242 are provided. The input resistance 244 is connected between the input coupling capacitor 218 and the input to the buffer circuits 240 and 242. The feedback resistor 246 is coupled from the output of field effect transistors 234 and 236 to the input to the buffer circuits. The entire circuit may be considered to be a special operational amplifier, with the gain being equal to the feedback resistance divided by the input resistance. With the feedback resistor 246 selected to be 20,000 ohms and the input resistor 244 having a resistance of 1,800 ohms, the gain may be calculated to be about 11.1. With the rated input voltage of 30 volts peak-to-peak, the voltage output calculates to be about 333 volts. The actual output voltage approximated 350 or 375 volts, as shown in FIG. 19.

FIG. 21, made up of FIG. 21a on one sheet and FIG. 21b on another, is a detailed circuit diagram which elaborates on the functional diagrams of FIGS. 18 and 20. Further, the reference numerals from these earlier figures are carried over to FIG. 21. Although the circuit is considered self-explanatory to one skilled in the art, it is noted in passing that the transistors 252 and the operational amplifier 254 are part of the control circuitry which provide biasing currents to their associated field-effect transistors.

It is also noted that the requirements of high linearity (within 1 or 2 percent and preferably within one-half of one percent), the 250 KHz frequency, and the relatively high voltage (300-375 volts) means that there are no commercially available operational amplifiers which will perform the necessary functions. Incidentally, in order to maintain a sharply defined 250 KHz sawtooth wave, with good linearity both up-and-down from peak-to-peak, a bandwidth of about 10 to 20 MHz is required. Concerning another aspect of the circuitry, the "cascode" circuit configuration of the FET's is advantageous in reducing so-called Miller capacitance. Incidentally, cascode amplifier circuits are discussed in many texts, including *Integrated Circuit Engineering* by Arthur B. Glaser and Gerald E. Subak-Sharpe, Adison-Wesley Publishing Co., Reading, Mass., Copyright 1978.

Conclusion

The Applicants, in tests, have demonstrated how this novel type of laser pulse compression, while enjoying the advantages of a CW heterodyne detection system, may yield accurate information in range, 0.22 rms meters, and in radial velocity, 0.37 rms m/s. They have demonstrated how a sealed waveguide $CO_2$ laser, may be modulated to 100 MHz, using a CdTe modulator. Though theoretically one would expect a 10 ns compressed pulse width, they obtained a 15 ns pulse width. This was shown to be caused by phase distortion or mismatch, of $\gamma(T\Delta f) \simeq 2.7$.

It was also shown how, by the use of a weighting filter, the quality of the compressed pulse could be improved. Though in their experiments the weighting was done in the frequency domain, $H(\omega)$, in the actual rangefinder system it would be preferred to use the time domain, $h(t)$, such that the transmitted signal would be of the form $$E_t = h(t) A_o \exp j \left[ \omega_t t + \frac{\mu t^2}{2} \right] + C.C.$$

where the weighting function would be $$h(t) = 1 + \cos \left[ \frac{t}{T} (2\pi) \right]$$

for $|t| < T/2$.

It is easily seen that this would correspond to the weighting filter transfer function, $H(\omega)$, shown in Equation (19). The time domain weighting function is not susceptible to Doppler shift error from its center frequency as it would be the case with, $H(\omega)$.

The following references are considered to be of interest, and some of them have been referred to hereinabove, and the teachings thereof as employed within the present invention are incorporated herein by reference to avoid redundancy and undue complication of this application:

[1] Claude R. Cooke, "Laser Radar Systems, Some Examples", SPIE Vol. 128, pp. 103-107 (1977).

[2] P. A. Forrester, K. F. Hulme, "Review Laser Rangefinders, Optical and Quantum Electronics", Vol. B, pp. 259-293 (1981).

[3] P. M. Woodward, "Probability and Information Theory, with Applications to Radar", Pergamon Press, Oxford, (1953).

[4] C. E. Cook and M. Bernfeld, "Radar Signals an Introduction to Theory and Application", Academic Press, (1967).

[5] K. F. Hulme, B. S. Collins, G. D. Constant, J. T. Pinson, "A $CO_2$ Laser Rangefinder Using Heterodyne Detection and Chirp Pulse Compression", Optical and Quantum Electronics, Vol. 13, pp. 35-45 (1981).

[6] J. E. Keifer, T. A. Nussmeier, and F. E. Goodwin, "Intracavity CdTe Modulators for $CO_2$ Lasers", IEEE Journal of Quantum Electronics, Vol. QE-8, No. 2, pp. 171-179 (February 1972).

[7] A. Yariv, "Quantum Electronics", John Wiley & Sons Inc., Second Edition (1975).

[8] A. VanLerberghe, S. Avrillier, and C. J. Borde, "High Stability CW Waveguide $CO_2$ Laser for High Resolution Saturation Spectroscopy", IEEE Journal of Quantum Electronics, Vol. QE-14, No. 7, pp. 481-486 (July 1978).

[9] J. R. Klauder, A. C. Price, S. Darlington, and W. J. Albersheim, "The Theory and Design of Chirp Radars", The Bell System Technical Journal, Vol. 34, No. 4, pp. 745-808 (July 1960).

It is to be understood that the foregoing detailed description and the accompanying drawings merely disclose an illustrative embodiment of the invention. Various alternatives may be employed without departing from the spirit and scope of the invention. Thus, by way of example, and not of limitation, certain types of radars, known as homodyne systems, do not use a local oscillator, but beat the return signal with a small sample of the transmitted signal, and the radar receiver analyzes the intermodulated offset frequency swept signals, in a manner known per se. Other changes such as the substitution of equivalent different biasing or inverting circuits, for example, in the driver circuitry of FIGS. 18, 20, 21, may be made. Accordingly, the present invention is not limited to the precise system or circuitry as shown in the drawings or described in detail hereinabove.

What is claimed is:

1. The method of operating a laser radar system comprising the steps of:
   (a) actuating a transmitter laser to emit laser light at approximately a preselected center frequency;
   (b) frequency modulating the light of the transmitter laser in linear chirps by passing it through an electro-optical crystal disposed within the cavity of the transmitter and driving the crystal with a linear chirp drive signal from a precision linear driver;
   (c) actuating a local oscillator laser to emit laser light at a predetermined frequency offset from said center frequency by a frequency substantially greater than the maximum frequency shift of said transmitter laser;
   (d) sensing a portion of the laser light from the transmitter laser and the local oscillator laser and adjusting the frequencies of the two lasers as function of the sensed portion to maintain the transmitter and local oscillator lasers emitting at exactly the preselected center frequency and offset frequency, respectively;
   (e) transmitting the balance of the light from the transmitter laser as the radar beam;
   (f) receiving reflected return signals from the transmitted laser beam and heterodyning them with a portion of the light from the local oscillator to form a combined beam;
   (g) detecting the combined beam and creating a resultant electrical signal representing the combined beam;
   (h) applying the resultant signal to a matched surface acoustic wave delay means to create a sharp pulse at the output thereof; and
   (i) sensing the electrical signal from the output transducer of the surface acoustic wave delay device and using said signal as the return signal from the radar for processing and analysis.

2. The method of claim 1 and additionally comprising:
   after step (g) and before step (h) thereof, increasing the frequency of the electrical signal from a frequency matched to the detector employed in step (g) to a frequency matched to the delay device employed in step (h).

3. The method of claim 2 and additionally comprising:
   after the additional step of claim 2 and before step (h) of claim 1, passing the electrical signal through a weighting filter to reduce sidelobes thereof.

4. The method of claim 3 wherein:
   said step of increasing the frequency of the electrical signal comprises increasing it to a frequency matched to the center frequency of the weighting filter employed.

5. The method of claim 3 wherein:
   said step of increasing the frequency of the electrical signal comprises increasing it from a base frequency in the order of 100 MHz to a frequency in the order of from several hundred to 1,000 MHz.

6. A method as defined in claim 1 wherein:
   said electro-optical crystal has two plates, and including the steps of driving a first one of said plates with a linear up and down sawtooth chirp modulating waveform having a predetermined phase and a peak-to-peak voltage greater than 200 volts, and driving the other of said plates with a sawtooth waveform of substantially the same characteristics, but substantially 180 degrees out of phase with that applied to said first plate.

7. A method as defined in claim 6 including the step of driving said plates at a frequency of at least 200,000 hertz, and with deviations from linearity of less than two percent.

8. A laser radar transmitter/receiver system comprising:
   (a) a transmitter laser including first translator means for causing said transmitter laser to emit a first beam of light at approximately a pre-established base or center frequency;
   (b) an electro-optical crystal adapted to be connected to an actuating signal and disposed within the cavity of said transmitter laser to frequency modulate said beam of light being emitted therefrom;
   (c) precision linear driver means operably connected to said electro-optical crystal for applying a linear chirp drive signal thereto;
   (d) a local oscillator laser including second translator means for causing said oscillator laser to emit a second beam of light at a second predetermined frequency offset from the center frequency of said transmitter laser by a frequency substantially greater than the maximum frequency shift of said transmitter laser;

(e) first feedback control means connected to said first translator means and disposed to sense a portion of said first light beam for dynamically adjusting said first translator means to maintain said first light beam at exactly said base or center frequency;

(f) second feedback control means connected to said second translator means and disposed to sense a portion of said second light beam for dynamically adjusting said second translator means to maintain said second light beam at exactly said second predetermined frequency;

(g) means for transmitting said first light beam as the transmitted beam of the radar;

(h) means for receiving reflected return signals from said first beam and for heterodyning the return signals with a portion of said second beam to form a combined beam;

(i) detector means disposed to have said combined beam impinge thereon for outputting a chirped electrical signal reflecting said combined beam; and (j) surface acoustic wave delay device means coupled to receive said electrical signal at an input thereof for transforming the electrical chirped waveform signal reflection of said combined beam into an electrical pulse waveform signal at an output thereof to be used as the input for radar return signal processing.

9. The radar system of claim 8 and additionally comprising:
frequency up conversion means disposed between said detector means and said delay device means for increasing the frequency of said electrical signal from a frequency matched to said detector means to a frequency matched to said delay device means.

10. The radar system of claim 9 and additionally comprising:
weighting filter means disposed between said frequency up conversion means and said delay device means for removing sidelobes from said electrical signal.

11. The radar system of claim 10 wherein:
said frequency up conversion device is adapted to increase said frequency to a frequency matched to the center frequency of said weighting filter means.

12. The radar system of claim 10 wherein:
said delay device means comprises a pair of surface acoustic wave delay devices responsive to an up-chirp and a down-chirp, respectively.

13. The radar system of claim 8 wherein:
said crystal is a CdTe FM cut crystal.

14. The radar system of claim 8 wherein:
said lasers are grating controlled, high-pressure $CO_2$ lasers.

15. A radar system as defined in claim 8 wherein said electro-optical crystal includes two plates, and including means for driving a first one of said plates with a linear up-and-down sawtooth chirp modulating waveform having a predetermined phase, and a peak-to-peak voltage greater than 200 volts, and means for driving the other of said plates with a sawtooth waveform of substantially the same characteristics but substantially 180 degrees out of phase with that applied to said first plate.

16. A radar system as defined in claim 15 including:
means for driving said plates at a frequency of at least 200 KHz and with deviations from linearity in both the positive and negative slopes of less than two percent.

17. A radar system as defined in claim 15 wherein:
said peak-to-peak voltage is more than 300 volts.

18. In a chirped, heterodyned laser radar system employing a transmitting laser, a local oscillator laser, and intracavity electro-optical device within the transmitting laser to modulate the transmitted laser beam, and a surface acoustic wave delay device to transform the electrical signal of the detected return beam into a pulse waveform for processing, the improvement comprising:

(a) a CdTe FM cut crystal employed as the intracavity device;

(b) a precision linear driver device connected to drive said crystal with a chirp drive signal, linear to at least ±0.5%; and (c) feedback loop means coupled to the drive translators of each of the lasers and adapted to sense the frequency of the light from said lasers for maintaining said transmitting laser emitting light at exactly a pre-established base or center frequency, and for maintaining said local oscillator at a second predetermined frequency offset by an exact frequency difference from said base or center frequency.

19. A radar system as defined in claim 18 wherein:
said lasers are grating controlled, high-pressure $CO_2$ lasers.

20. A radar system comprising:
a transmitter laser including translator means for causing said transmitter laser to emit a beam of light substantially at a predetermined base or center frequency;
electro-optical crystal means having two electrodes, disposed within the cavity of said transmitter laser to frequency modulate the emitted beam of light;
means for driving a first one of the electrodes of said electro-optical crystal means with a linear up and down sawtooth modulating waveform having a predetermined phase, and a peak-to-peak voltage greater than 200 volts, and with the departures from linearity of said waveform being less than two percent;
means for driving the other electrode of said electro-optical crystal means with a sawtooth waveform having substantially the same characteristics, but substantially 180 degrees out of phase with respect to that applied to the first electrode;
means for receiving a return signal constituting a portion of the transmitted light reflected from a distant target; and
means for processing the return signal.

21. A radar system as defined in claim 20 wherein:
said processing means includes a component having a delay vs. frequency response characteristic which is matched to the FM modulated output of said transmitter laser.

22. A radar system as defined in claim 20 wherein:
each of said crystal electrode driving circuits includes a plurality of field effect transistors arranged in a cascode circuit configuration.

23. A radar system comprising:
a transmitter laser including translator means for causing said transmitter laser to emit a beam of light substantially at a predetermined base or center frequency;

electro-optical crystal means having two electrodes, disposed within the cavity of said transmitter laser to frequency modulate the emitted beam of light;

means for driving a first one of the electrodes of said electro-optical crystal means with a linear up-and-down sawtooth modulating waveform having a predetermined phase, a frequency above 200 KHz, and a peak-to-peak voltage greater than 200 volts, and with the departures from linearity of said waveform being less than two percent;

means for driving the other electrode of said electro-optical crystal means with a sawtooth waveform having substantially the same characteristics, but substantially 180 degrees out of phase with respect to that applied to the first electrode;

means for receiving a return signal constituting a portion of the transmitted light reflected from a distant target; and means for processing the return signal.

24. A radar system as defined in claim 23 wherein:
said processing means includes a component having a delay vs. frequency response characteristic which is matched to the FM modulated output of said transmitter laser.

25. A radar system as defined in claim 23 wherein:
each of said crystal electrode driving circuits includes a plurality of field effect transistors arranged in a cascode circuit configuration.

26. A radar system comprising:
a transmitter laser including means for causing said transmitter laser to emit a beam of light having a predetermined base or center frequency;

electro-optical crystal means having two electrodes, disposed within the cavity of said transmitter laser to frequency modulate the emitted beam of light;

means for driving a first one of the electrodes of said electro-optical crystal means with a linear up-and-down sawtooth modulating waveform having a predetermined phase;

means for driving the other electrode of said electro-optical crystal means with a sawtooth wavefrom having substantially the same characteristics, but substantially 180 degrees out of phase, with respect to that applied to the first electrode;

means for receiving a return signal constituting a portion of the transmitted light reflected from a distant target; and means for processing the return signal.

* * * * *